(12) United States Patent
Burst, Jr.

(10) Patent No.: US 7,088,677 B1
(45) Date of Patent: Aug. 8, 2006

(54) SYSTEM AND METHOD FOR DELAY-BASED CONGESTION DETECTION AND CONNECTION ADMISSION CONTROL

(75) Inventor: Kenneth N. Burst, Jr., Birmingham, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 969 days.

(21) Appl. No.: 10/086,315

(22) Filed: Mar. 1, 2002

(51) Int. Cl.
*G01R 31/08* (2006.01)
*H04L 12/28* (2006.01)

(52) U.S. Cl. .................................. 370/229; 370/401
(58) Field of Classification Search .................... None
See application file for complete search history.

(56) References Cited

U.S. PATENT DOCUMENTS

| | | | |
|---|---|---|---|
| 6,215,768 B1 | 4/2001 | Kim et al. | |
| 6,259,677 B1 | 7/2001 | Jain | |
| 6,259,695 B1 | 7/2001 | Ofek | |
| 6,292,466 B1 | 9/2001 | Droz | |
| 6,314,085 B1 | 11/2001 | Saranka | |
| 6,324,166 B1 | 11/2001 | Yokoyama et al. | |
| 6,882,653 B1* | 4/2005 | Kiuchi et al. ............... | 370/401 |
| 2001/0030978 A1* | 10/2001 | Holloway et al. .......... | 370/503 |
| 2004/0218585 A1* | 11/2004 | Huang ....................... | 370/352 |
| 2004/0218617 A1* | 11/2004 | Sagfors ..................... | 370/412 |

OTHER PUBLICATIONS

"Making Voice-over-IP Perform as Advertised with QoS," SITARA Networks, (2001) pp. 1-7, Sitara Networks, Inc., Waltham, MA.

"Optimizing yours Network without Suboptimizing your Router," SITARA Networks, (2000) pp. 1-11, Sitara Networks, Inc., Waltham, MA.

"Voice Over Packet," Texas Instruments, (Jan. 1998) pp. 1-14, Version 2.1 SPEY0005, Telogy Networks.

"Quality of Service in Voice, Video and Data Networks," A Memotee Communications White Paper, (2000) pp. 1-8, Memotee Communications, Inc.

Bregman, David, "QoS for Converged Voice/Data Networks," (2001) pp. 1-15, NetReality.

"Working the QoS Puzzle," Computer Telephony, (Jan. 5, 2001) pp. 1-10, www.cconvergence.com/article/CTM20001221S0002.

(Continued)

*Primary Examiner*—Duc Ho
(74) *Attorney, Agent, or Firm*—Merchant & Gould

(57) ABSTRACT

Systems and methods for performing congestion detection and connection admission control for a communications network utilizing the observed one-way delay of packets transmitted through the network are described. Embodiments of the present invention provide endpoints on the network, which can anticipate congestion accurately enough to prevent packet loss and excess delay while, at the same time, fully utilizing network resources. In one embodiment of the present invention, a communications service provider replaces conventional tandem switches in a public switched telephone network with Internet protocol (IP) tandems. The IP tandem includes a media gateway, which performs congestion admission control for voice over IP (VoIP) communications. When delay in the communications network exceeds a delay threshold, the media gateway may reject the communications request or may route the request over an alternative channel.

45 Claims, 10 Drawing Sheets

OTHER PUBLICATIONS

Breslau, Lee, et al., "Endpoint Admission Control: Architectural Issues and Performance," SIGCOMM '00, (2000) pp. 57-69, Stockholm, Sweden.

Bianchi, G., et al., "PCP-DV: an End-to-end Admission Control Mechanism for IP Telephony," pp. 1-11.

Raj Jain, "A Delay-Based Approach for Congestion Avoidance in Interconnected Heterogeneous Computer Networks," Digital Equipment Corporation, (Apr. 11, 1989) pp. 1-16.

* cited by examiner

PSTN Tandem Arrangement

SYSTEM AND METHOD FOR DELAY-BASED CONGESTION DETECTION AND CONNECTION ADMISSION CONTROL

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

FIELD OF THE INVENTION

The present invention generally relates to congestion detection in a communications network. The present invention more particularly relates to the delay-based congestion detection and connection admission control in a communications network.

BACKGROUND

Conventional telecommunications providers offer a broad variety of services, including both voice and data services. As these providers continue to extend their service offerings, they constantly strive to minimize the costs of providing these services. The consolidation of voice and data services provides a substantial opportunity for savings. However, the consolidation of these services and corresponding decrease in cost must not come at the expense of the quality in voice communications services (referred to herein as "Quality of Service" (QoS)).

Other organizations, such as large corporations, face similar challenges. As with telecommunications providers, the integration of voice and data networks within an organization presents a great potential for savings. Conventional separation of private branch exchange (PBX) and Internet/Intranet often involves significant expense. Organizations typically find it more efficient and cost-effective to design, deploy, maintain, and support a single integrated network than to support separate data and voice solutions.

Conventional voice systems rely on circuit-based equipment. Circuit-based equipment provides high reliability and scalability, almost universal interconnection, and a tremendous installed base. In contrast, conventional packet-based telephone systems, such as Internet telephony, often provide limited reliability and scalability. Protocols conventionally utilized in packet-based networks, such as file transfer protocol (FTP) and hypertext transfer protocol (HTTP), are opportunistic, taking as much bandwidth as is available. Therefore, mixing voice and data in a single, uncontrolled, packet-based network, often results in low QoS due to a variety of factors, such as jitter, packet loss, and excessive delay. Callers recognize the degradation in QoS resulting from jitter, packet loss, and delay as voice distortion, loss of portions of words or sentences, echoes, talker overlap, and dropped calls. A certain amount of delay is inherent in any packet-based voice implementation, including a voice over Internet protocol (VoIP) implementation. However, if the total delay is greater than 150–200 milliseconds, QoS will be generally unacceptable.

Jitter, caused by variable inter-packet timing, is one source of QoS degradation in VoIP services. In a converged network in which voice and data packets are interleaved, normally orderly packetized voice arrives at disorderly intervals. Conventional systems implement jitter buffers to address the problem of jitter. Unfortunately, the addition of jitter buffers result in increased delay in the network.

Packet loss occurs when routers begin to overflow during periods of congestion, forcing them to drop packets. Conventional systems attempt to account for packet loss in a variety of ways. For example, a conventional system may compensate for lost packets by interpolation, replaying the last packet received to fill in the non-contiguous speech. Interpolation is effective only for a very small number of lost packets. Other conventional systems send redundant information so that the information contained in the lost packets may be replaced with information contained in successfully transmitted packets. Sending redundant information results in increased traffic and requires greater bandwidth and therefore may cause greater delay within the network. Another conventional approach sends redundant packets but utilizes a codec that results in a smaller number of packets and therefore requires less bandwidth. Although this approach decreases the bandwidth requirements inherent in sending redundant packets, the approach increases the delay and reduces voice quality due to coding effects.

QoS degradation may also result from delay. Delay causes two problems: echo and talker overlap. Echo is caused by the signal reflection of the speaker's voice from the far end telephone equipment back into the speaker's ear. To eliminate echo, conventional systems may implement an echo canceller. These are active devices used by phone companies to suppress positive feedback (singing) on the phone network. They work by predicting and subtracting a locally generated replica of the echo based on the signal propagating in the forward direction. To eliminate talker overlap, a VoIP system must reduce the total delay experienced during the VoIP call.

Delay includes the time necessary to collect a packet or frame of voice samples to be transmitted, to code and packetize the collected packets, and to transmit the resulting packets over the physical network. Delay results from several sources, including processing delay, queuing delay, transmission delay, and propagation delay.

Because of the degradation that can affect voice communications in a packet-based network and because of the complexity and cost of converting existing circuit-based systems, telecommunications providers have been slow to implement packet-based networks for the transmission of voice. Large traditional voice carriers are just beginning to merge their existing Public Switched Telephone Networks (PSTN) with their data networks using Voice over IP (VoIP) or Voice over Asynchronous Transfer Mode (ATM). But the carriers understand that without acceptable QoS, callers will avoid VoIP.

In order to both provide this voice quality and to begin merging the PSTN with the data network, the carrier must provide a level of QoS which provides low loss and a reasonable delay for the RTP voice packets in the IP core, and at the same time provide, as a minimum, best effort service for data. In addition to best effort service for data, the carrier may wish to provide other levels of QoS for other types of communications, include video and fax.

Several conventional approaches exist for maintaining QoS in a mixed-service packet network. These approaches include (1) using differentiated levels of priorities, wherein the voice packets receive the highest priority and the data packets receive a lower priority; (2) reserving a path through the network across which the communication can traverse; and (3) performing endpoint or connection admission control. While each of these approaches has its advantages and disadvantages, none provides both a simple, and at the same time, effective means of ensuring QoS for VoIP communication.

One of the simplest conventional approaches for maintaining QoS for VoIP is through the use of differentiated services, assigning different priorities for the real-time packets containing the VoIP packets relative to other packets in the network. Traditional IP networks use Native IP Forwarding (NIF). A router determines a packet's next hop route by the finding the longest match of the destination IP address with a prefix in the routers forwarding table. At the destination point of each hop, a router reexamines the IP header for the destination IP address and performs the longest match on it's own forwarding table to determine the next hop. This process repeats hop by hop until the packet reaches its final destination. Note that with NIF, the routing table is the only state information processed and maintained in the router.

In the DiffServ model, packets entering a network domain are classified and marked with a DiffServ code point (DS code point) according to their requirements for Per Hop Behavior (PHB). The PHB is a forwarding behavior that represents queuing and servicing disciplines in the routers. PHBs provide a means of allocating bandwidth and buffers according to the relative requirements of the packets being transferred across the network. Packets are grouped into classifications, and all packets in a classification receive the same treatment. The key characteristic of DiffServ is that classification and treatment are relative. No reservations are made, and thus one classification might receive higher priority relative to other classifications to reduce delay. Another classification might get better treatment relative to other classifications to reduce loss. Ultimately a limited set of resources is divided among the various classifications, and, if traffic is excessive, loss or excessive delay may occur. However, DiffServ has the advantage of not requiring the processing and storing of additional state information needed by Multi-protocol Label Switching (MPLS) (described below).

Another approach for ensuring QoS for VoIP is to set up resource reservations in routers across the IP network. The QoS requirement may be expressed in the form of bandwidth, delay, or jitter, or may involve specifying an explicit route across the network. This approach may be implemented using Multi-protocol Label Switching (MPLS) with some type of bandwidth reservation capability.

MPLS is the most popular standard of label-based forwarding. The foundation for label-based forwarding is Forwarding Equivalency Class (FEC). An FEC is assigned as a packet enters the network and can be based on information gleaned from the packet header including destination IP address or on information not available in the header such as the ingress port. A Label representing the FEC is pre-pended to each packet, and subsequent forwarding decisions are based on these Labels without examining the packet header at each hop. In practical terms, at each hop, rather than examining the destination address in the header, the Label is examined and used as an index to a table that contains the next hop to which the packet should be forwarded. All packets in an FEC are treated equivalently as they are forwarded across the network. This is similar to switching in an ATM or Frame Relay network in which a Virtual Path Identifier/Virtual Circuit Identifier (VPI/VCI) or Data Link Connection Identifier (DLCI) identifies a Permanent Virtual Circuit (PVC) or Switched Virtual Circuit (SVC). The forwarding decision is accomplished by a table lookup in the switch using the VPI/VCI or DLCI along with the ingress port. In an ATM or Frame Relay network, the entries are placed in the table when PVCs or SVCs are established either by signaling or using a network management system. In MPLS, these table entries are placed using a reservation protocol such as RSVP or CR-LDP, which are described below. The addition of these switching tables in routers represents a second form of state information that must be processed and maintained in addition to the routing tables associated with NIF.

In MPLS a label distribution protocol is used to distribute the label and associated next hop information to Label Switching Routers (LSRs) throughout the network. Other information may also be distributed and contained in these tables as well. There are two protocols that have been designed to perform this function, Label Distribution Protocol (LDP) and Resource ReSerVation Protocol (RSVP). LDP was originally designed to distribute labels to LSRs but is in the process of being extended to make resource reservations. The extended form of LDP is called Constraint based Routing-LDP (CR-LDP). RSVP was originally designed to make resource reservations, but has been extended to perform label distribution. The extended form of RSVP is called RSVP-Traffic Engineering (RSVP-TE). Both CR-LDP, and RSVP-TE perform a signaling function that enables some form of Quality of Service (QoS) across MPLS. This signaling reserves resources, which are essentially router queues. These routing queues ultimately represent bandwidth along routes in the network, and this reserving of bandwidth for a particular FEC enables QoS. If insufficient resources are available to provide QoS for a particular call, the connection is refused. This is called connection admission control (CAC).

The advantage of this approach is that the reservations are not relative to other traffic on the network as in the case of DiffServ, but are much closer to being guaranteed. One of the problems with this approach is that implementing RSVP-TE or CR-LDP in high-speed core routers requires these routers to process and maintain state information for the label switching tables and reserved bandwidth. Building high-speed core routers with these capabilities is complex and very expensive. Also, these capabilities need to be implemented in every router in the network. This violates one of the principles of TCP/IP, which is to process and maintain a minimum amount of state information in the core, keeping the core fast and simple, while CPU intensive tasks are pushed to the edge. Scalability is a problem as well, since at least in its simplest form, a reservation has to be made for each call originated across the network. In order to avoid this, tunnels can be reserved and calls aggregated into these for transport across the network. This too has its problems in that it makes the process even more complicated and increases the difficulty in fully utilizing resources in the network. It also still requires the core routers to process and maintain the additional state information for the label switching tables and reserved bandwidth.

Another alternative approach is to provide Endpoint or Connection Admission Control (CAC). Traditional PSTNs rely on local switches to perform this CAC function when the network is too busy to process a call. A CAC approach in a packet-based network could rely on a variation of the reservation approach discussed above in which an error code is returned if the attempt to create a reservation is unsuccessful. Upon return of the error code, the phone could emit a busy signal.

An alternative CAC approach maintains a simple core IP network and provides a means for the edge devices to perform CAC. Under such an approach, a packet stream requests service from a network edge device, such as a media gateway, and the device includes a means to detect impending congestion in the IP core. The device either accepts or rejects the request based on the congestion state. This method would push congestion control from the core to the edge and thus simplify the job of the core routers because it requires no support from the core IP routers; the core routers do not process or maintain state information other than traditional routing tables.

Several conventional methods for performing CAC in a packet-based network exist. In one method, the routers use congestion marking. However, this method requires more functionality be added to the router, increasing the complexity of the core routers. Another method utilizes packet drops to determine congestion. But for voice applications, the objective is to avoid congestion before drops occur.

Another conventional method is to use a black box approach to congestion avoidance with implicit feedback based on increased delay. However, conventional methods of this type use window-based flow control for each individual user. Also these conventional methods assume deterministic delays and fail to examine the effects of stochastic delays experienced in an actual network. In addition, these conventional methods utilize round-trip delay rather than one-way delay.

A further conventional method utilizes probing packets. Endpoints, such as media gateways or other hosts, probe the network to detect the level of congestion. The endpoint admits connections only if the level of congestion is sufficiently low. To accurately determine the congestion of the network, the endpoint sends probe packets at the data rate VoIP call will require and records the resulting level of packet losses, jitter, or other congestion indicator. For example, in one conventional approach, the probe packets are sent in a DiffServ code point that is a low priority FEC. The data, which requires the QoS, is placed in the high priority FEC.

Although a CAC method based on probing may accurately measure congestion, the probing and feedback phases slow down the admission decision significantly. Probing causes a delay while the probing packet is sent and either feedback is received or a timeout period expires. This delay creates a significant setup delay for the VoIP call, on the order of seconds, and VoIP applications will not tolerate such long set-up delays.

In another conventional CAC method, the endpoint attempts to determine the amount of bandwidth a specific communication will require and then attempts to determine if the required bandwidth is available on the network. For example, the patent to Hiroyuki Yokoyama, et al., U.S. Pat. No. 6,324,166, describes a call setup control apparatus, which determines the amount of bandwidth consumed by current calls, compares that amount with the available bandwidth, and accepts or rejects call requests based on the comparison. And the patents to Patrick Droz, U.S. Pat. No. 6,292,466, and to Gyeong-Seok Kim, U.S. Pat. No. 6,215,768, describe similar systems and methods. Also, the patent to Sari Saranka, U.S. Pat. No. 6,314,085 describes a similar method for performing CAC based on the probability of cell loss given a known capacity. Utilizing estimated bandwidth requirements to perform CAC is relatively ineffective because the differing coding schemes used to transmit voice over packet networks cause great difficulty in accurately predicting voice bandwidth requirements.

SUMMARY

The present invention provides systems and methods for performing congestion detection and connection admission control for a communications network, utilizing the observed one-way delay of packets transmitted through the network. Embodiments of the present invention provide endpoints on the network, which can anticipate congestion accurately enough to prevent packet loss and excess delay while, at the same time, fully utilizing network resources.

In an embodiment of the present invention, the core communications network is maintained and a means is provided for edge devices, such as media gateways, to detect impending congestion in the core. Based on this information, the edge devices can refuse new incoming connections to the media gateways to mitigate the congestion. This is called Connection Admission Control (CAC), and traditional PSTNs rely on local switches to perform this CAC function when the network is too busy to process a call. In this manner the gateways can maintain voice quality while keeping the core fast and simple.

In an embodiment of the present invention, a carrier implements an Internet protocol (IP) voice tandem to interconnect conventional public switched telephone network (PSTN) switches. In order to provide the carrier's traditional high-quality voice service while merging the PSTN and packet-based network technology, the carrier must employ a level of QoS which provides low loss and a reasonable delay for real-time protocol (RTP) voice packets in the Internet protocol (IP) network core, and at the same time provide, as a minimum, best effort service for data.

The IP voice tandem includes a media gateway, which periodically transmits high-priority control packets through a packet-switched network, such as an IP network, to determine the least amount of time for a packet to traverse the network. The media gateway transmits real-time protocol (RTP) bearer packets at a relatively lower priority and measures the time it takes for the bearer packet to traverse the network. The media gateway uses the results of these observations to infer whether or not the network is congested. In one embodiment, the media gateway calculates a delay threshold (Dt), above which the network is congested. If the media gateway infers that the IP network is congested, the gateway refuses connection requests until the congestion subsides.

In an embodiment of the present invention, the delay threshold may be determined using a variety of methods. For example, in one embodiment, the media gateway calculates Dt by determining a mean control packet delay; multiplying the mean control packet delay by a multiplier; determining a minimum control packet delay; and adding the result of the multiplying to said minimum control packet delay. The multiplier may be varied for network tuning purposes.

In an embodiment of the present invention, the media gateway creates control packets with a timestamp, indicating when the packets were sent to the transmission queue. The media gateway then classifies the packets, setting the priority to the highest priority in the network. For example, the media gateway may used Differentiated Services (DiffServ) and set various DS code points to classify the packets. The media gateway then transmits the control packets to the destination. The destination gateway receives the control packets and calculates the delay threshold (Dt), above which the network is congested.

The source gateway also classifies and transmits RTP bearer packets. The priority assigned to the bearer packets is lower than that assigned to the control packets. The destination media gateway receives the packets and determines whether the delay associated with the bearer packets exceeds Dt.

In one embodiment, the destination gateway performs Connection Admission Control (CAC). CAC may include refusing connection requests to nodes over links that the gateway has determined are congested. The refusal may be indicated to the caller by a busy signal. CAC may also include redirecting a call when the network is congested. For example, if a carrier utilizes an IP network for connecting calls from one regional office of a customer to another, the carrier may simply redirect calls to the customer's IXC when the IP network is congested.

In an embodiment of the present invention, the clocks in the media gateways need not be synchronized to calculate the delay and to detect congestion. However, if the gateways must decode TDM voice calls, they will need to be synchronized to a stratum 1-level timekeeping device. The stratum 1-level device may be an atomic or radio clock available over the Internet or may be a global positioning system (GPS) satellite.

Embodiments of the present invention provide numerous advantages over conventional systems and methods for congestion detection and connection admission control. An embodiment of the present invention requires no explicit support from the IP core routers. The routers are not required to maintain per-flow state or to respond to reservation requests. In an embodiment of the present invention, the conventional best-effort infrastructure is maintained and mechanisms are added to the edge devices to deliver high QoS. By avoiding any modifications to the routers, the operational and administrative overhead of implementing QoS measures is reduced substantially. Also, since changes to the core are unnecessary in an embodiment of the present invention, changes necessary to manage a greater diversity of traffic are more easily designed and implemented.

In an embodiment of the present invention, the determination of network congestion is based on delay rather than jitter, which is a more accurate threshold based on stochastic analysis. Also, in an embodiment of the present invention, edge devices employ binary endpoint admission control rather than a window mechanism as described. Also, no probing or feedback is required, but control packets are sent constantly, all of which result in a faster decision-making process. Unlike conventional approaches, the media gateway classifies control packets with a DiffServ code point that is a higher priority forwarding class than the RTP bearer packets requiring the QoS. Also, the method uses neither congestion marking nor packet dropping.

Various network service providers may advantageously implement an embodiment of the present invention. For example, regional, national and international InterExchange Carriers (IXCs) often provide web-hosting services. These providers may use an embodiment of the present invention on their existing IP networks to derive additional income. Also, Competitive Access Providers (CACs), which provide alternative long-distance service, may utilize an embodiment of the present invention to more successfully compete with the IXCs. In addition, Regional Bell Operating Companies (RBOCs) often provide Internet service or have alliances with Internet Service Providers (ISPs) and therefore provide a natural integration point from VoIP services. Competitive Local Exchange Carriers (CLECs) have similar incentives to implement an embodiment of the present invention. In addition, ISPs attempting to broaden their product offerings and thereby increase their revenue streams may use an embodiment of the present invention to leverage their existing IP infrastructure.

Further details and advantages of the present invention are set forth below.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Figure 1:
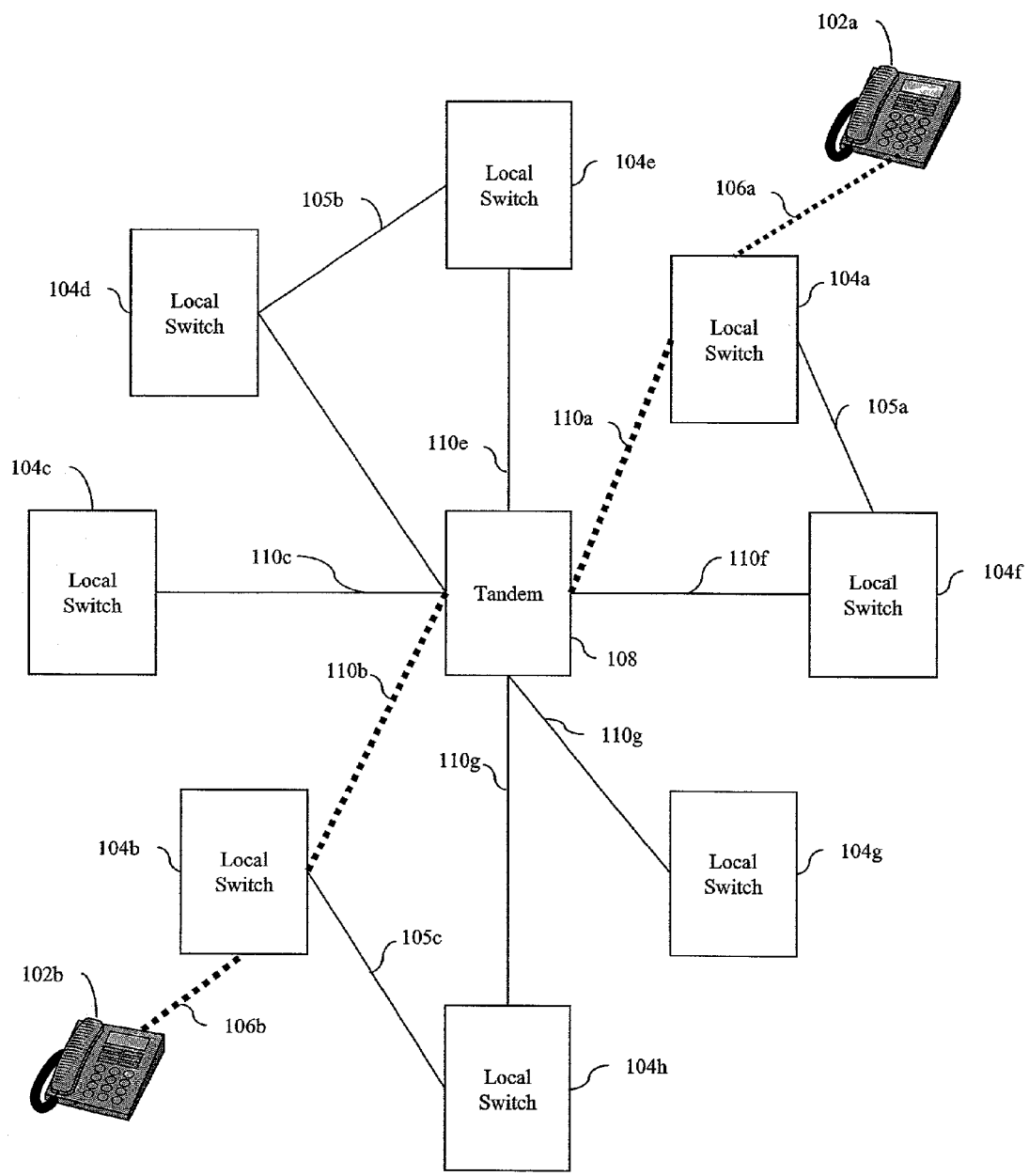
FIG. 1 is a block diagram of the general environment for operation of an embodiment of the present invention.

Embodiments of the present invention provide systems and methods for utilizing one-way delay of packets transmitted through a communications network to detect congestion in the communications network. In one embodiment of the present invention, a communications service provider, referred to herein as a carrier, replaces conventional tandem switches in a public switched telephone network with Internet protocol (IP) tandems. The IP tandem includes a media gateway, which performs congestion admission control for voice over IP (VoIP) communications. When delay in the communications network exceeds a delay threshold, the media gateway may reject the communications request or may route the request over an alternative channel.

In order to determine delay, a delay algorithm processor in the media gateway first calculates a threshold delay based on the minimum practical delay in the communications network. The threshold delay is the amount of delay at which the processor infers that the network is congested. The processor measures the minimum practical delay by utilizing a high-priority control packet. The processor then compares the calculated threshold delay with the actual delay experienced by bearer packets, which are transmitted using a lower priority than the priority assigned to the control packets. If the bearer packet delay exceeds the threshold delay, the communications network is congested. In one embodiment, the media gateway rejects communications request when the network is congested. In another embodiment, the media gateway reroutes the calls over an alternative communications means.

In one embodiment of the present invention, a traditional carrier deploys an IP voice tandem in a public switched telephone network (PSTN). The network also includes conventional 64 kb/s circuit switches. In order to deploy an IP voice tandem, the carrier either leverages an existing IP core, which was built to support data services, or deploys a new IP core. The IP core may be multiuse and, if so, provides packet forwarding not only for the real-time protocol (RTP) packets containing the time division multiplex (TDM) voice samples, but also provides packet forwarding for data, video, fax, or modem.

In an embodiment of the present invention, the carrier strives to provide a quality of service (QoS) for voice calls equal or nearly equal to the quality conventionally provided by the PSTN. The conventional carriers have a long-standing reputation as the provider of choice when it comes to quality and service. Therefore, the carrier does not want to be perceived by customers as reducing voice quality or service by implementing a packet-switched network.

In order to both provide a high level of voice quality and to begin merging the circuit-switched PSTN with the packet-switched data network, the carrier must provide a level of QoS which provides low loss and a reasonable delay for the RTP voice packets in the IP core, and at the same time provide, as a minimum, best effort service for data. In addition to best effort service for data, the carrier may wish to provide various levels of QoS for data, video, or fax.

To accomplish the necessary level of QoS for VoIP and maintain a simple IP core, an embodiment of the present invention provides a means for edge devices, such as media gateways, hosts, or other devices, to detect impending congestion in the core. Based on the observed state of the network, the edge devices refuse or accept new incoming connection requests in order to manage the congestion on the network. Such a process is referred to as Connection Admission Control (CAC), and conventional PSTN carriers utilize local switches to perform this CAC function when the network is too busy to process a call. By utilizing media gateways to perform CAC, the carrier can maintain voice quality while keeping the IP core fast and simple.

Referring now to the Figures, FIG. 1 is a block diagram of the general environment in which an embodiment of the present invention operates. When a caller wishes to place a call, the caller dials a directory number (DN) on a telephone 102a. The DN identifies a destination, such as telephone 102b. Telephones 102a,b are connected to local switches 104a,b via direct links 106a, b, which may be, for example, local loops. A PSTN includes a plurality of local switches 104a–h. PSTN trunks 105a–c interconnect these PSTN switches 104a–h. The PSTN trunks utilize International Telegraph and Telephone Consultative Committee (CCITT, ComitéConsultatif International Téléphonique et Télégraphique) Common Channel Signaling System no. 7 (CCS7). CCS7 is a standard protocol suite used for communication with, and control of, telephone central office switches and other telecommunications network equipment.

In an embodiment of the present invention, the local switches 104a–h also communicate with an Internet protocol (IP) voice tandem 108. Tandems interconnect other switches, such as local switches 104a–h, to each other and to other communication networks, such as Inter-exchange carriers' (IXCs) networks (not shown). The tandem 108 conventionally links 20 or 30 local switches located within the same metropolitan area or nearby cities. These local switches 104a–h are connected to customers' telephone lines on what is called the line side of the switch and connected to either each other or to the tandem 108 on the trunk side of the switch.

When a customer connected to a local switch 104a calls a customer connected to a second local switch 104b, the call may be directed from the calling party's local switch 104a through the tandem 108 to the called party's local switch 104b as shown in FIG. 1 by the dotted line. In a conventional PSTN network, when the network is too busy to complete a call, the calling party's local switch 104a performs connection admission control (CAC) by sending the originating terminal, telephone 102a, a busy signal. The caller knows this busy signal to mean to try the call again later when the network may not be busy.

Figure 2:
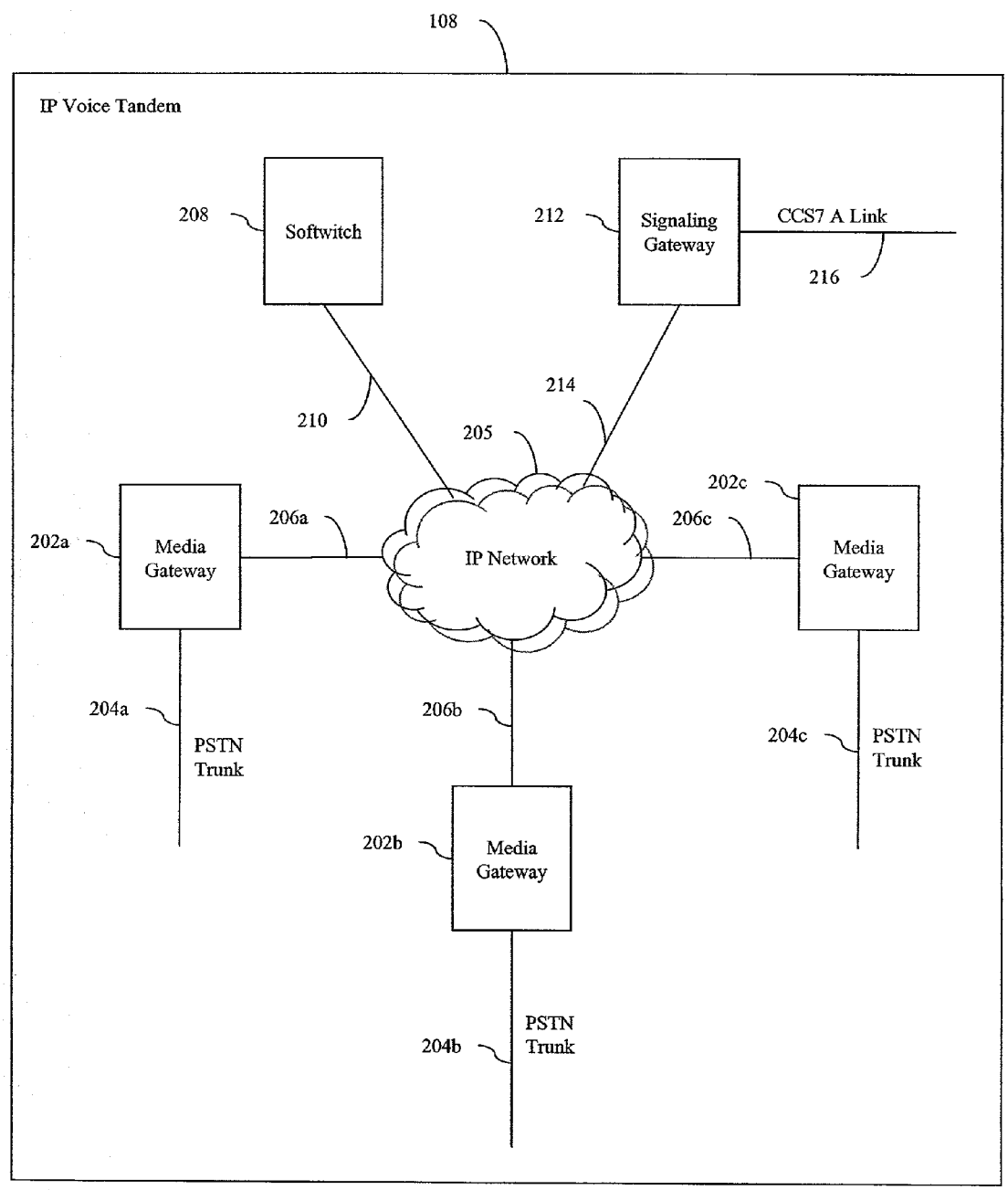
FIG. 2 is a block diagram of an Internet protocol (IP) voice tandem in an embodiment of the present invention.
Figure 3:
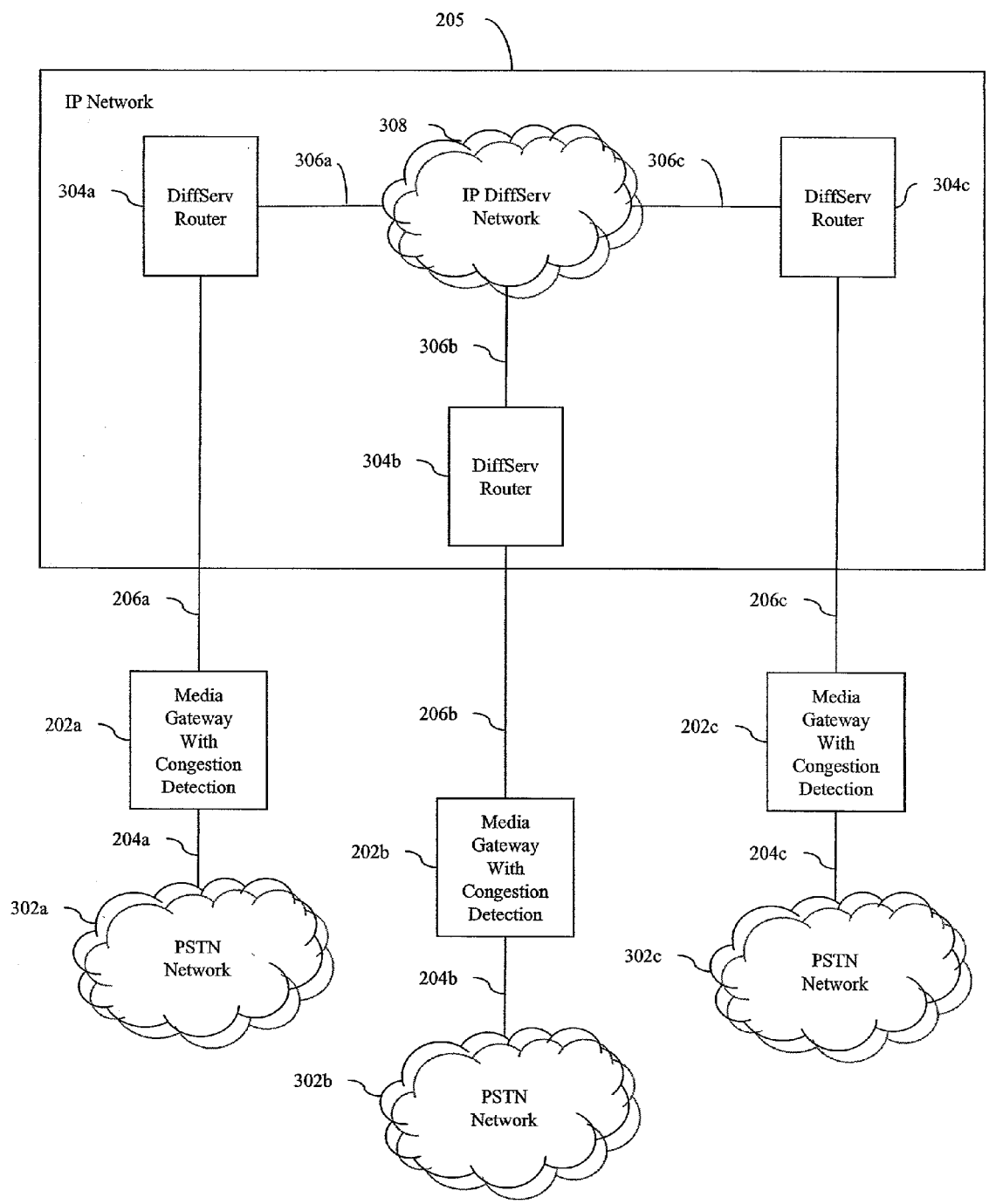
FIG. 3 is a block diagram of the IP voice tandem in communication with a differentiated services-capable IP network in an embodiment of the present invention.

In an embodiment of the present invention, an IP voice tandem 108 performs the CAC function. FIG. 2 is a block diagram of the IP voice tandem 108 in an embodiment of the present invention. The IP voice tandem 108 comprises Media Gateways 202a–c, an IP network 205, one or more softswitches 208, and one or more signaling gateways 212 as shown in FIG. 2. The IP network 205 portion of the IP voice tandem 108 is a network of interconnected routers running the IP protocol as illustrated in FIG. 3.

Conventionally, gateway is a generic term, describing a system for internetworking. Gateways may include hardware, software, or a combination of both and may operate at various levels of the Open Systems Interconnection (OSI) model. The media gateways 202 a–c in FIG. 2 are devices or combinations of devices that terminate switched service networks, packetize the data in IP packets, and deliver the packets to an IP-based packet network. They provide services to various transmission media. In general, media gateways may be connected to IP links terminating on routers, PSTN trunks 204a–c terminating on PSTN switches (not shown), primary rate integrated services digital network (ISDN) lines (not shown) terminating on ISDN devices (not shown), asynchronous transfer mode (ATM) links (not shown) terminating on ATM switches (not shown), as well as other types of transmission media.

Media gateway 202a performs a switching function and thus may switch voice calls from a PSTN trunk 204a to an IP network 205. In the embodiment shown in FIG. 2, 64 kb/s μ law encoded time division multiplexed (TDM) voice calls enter the media gateway 202a over the PSTN trunk 204a and are switched over an IP link 206a to the IP network 205 in the form of a Real Time Protocol (RTP) packet. TDM is a type of multiplexing where two or more data and/or voice channels are transmitted simultaneously over one communications link by interleaving the signals. Each channel allocates a different time interval, and the transmission includes a synchronizing signal to distinguish the various channels within the transmission. RTP is an Internet Engineering Task Force (IETF) standard for providing end-to-end network transport suitable for transmitting real-time data, such as audio, video, or simulation data, over multicast or unicast network services and is defined in RFC1889.

The RTP packet is forwarded over the IP network 205 to another media gateway 202c on the other side of the IP network 205 via IP link 206c. This second media gateway 206c receives the RTP packet from the IP network 205 and converts it back to a 64 kb/s μ law encoded TDM voice call transmitted over another PSTN trunk 204c. The call then proceeds to its ultimate destination over the PSTN network (not shown).

The media gateway 202a–c communicates with a softswitch 208, which is also known as a call agent, or media gateway controller, via IP network 205 and link 210. The softswitch 208 contains routing information. This routing information is configured by a network management system (not shown) and is used by the softswitch 208 to route incoming calls from media gateway 202a to media gateway 202c across the IP network 205. The IP network 205 in general will be a multiuse IP network which will provide packet forwarding not only for the RTP packets containing the TDM voice samples from the media gateways 202a–c, but may also provide packet forwarding for other applications such as data, video, fax, and modem.

The signaling gateway 212 interfaces the IP network via link 214 and with the CCS7 network (not shown) via a CCS7 link 216. The signaling gateway 212 acts as a CCS7 Signaling Point (SP) for the IP voice tandem 108. The CCS7 signaling gateway 212 receives the call from its originating local switch in the PSTN network and directs the call to its terminating local switch as illustrated in FIG. 1.

In one embodiment of the present invention, the IP network 205 comprises differentiated services-capable routers. FIG. 3 is a block diagram of the IP voice tandem 108, and its media gateways 202a–c in communication with a differentiated services-capable IP network 205 via links 206a–c.

Differentiated Services (DiffServ) is a method of providing a limited form of quality-of-service (QoS) across a router network, such as the one shown in FIG. 3. In the DiffServ model, packets entering a network domain are classified into behavior aggregates (BA) and marked with a DiffServ code point (DS code point) according to their requirements for Per Hop Behavior (PHB). The PHB is a forwarding behavior that represents queuing and servicing disciplines in the routers. PHBs provide a means of allocating bandwidth and buffers according to the relative requirements of the packets being transferred across the network. Packets are grouped into classifications, called behavior aggregates (BA), and all packets in a classification receive the same treatment.

In the embodiment shown, calls originating in the PSTN networks 302a–c arrive at the media gateways 202a–c via PSTN trunks 204a–c. The media gateways 202a–c forward the calls to DiffServ routers 304a–c, where they are routed via IP links 306a–c though a DiffServ-capable IP network 308. A router is a physical device that joins multiple networks together and operates at the network layer (three) of the Open Systems Interconnection (OSI) model. The router includes a routing table, which the router uses to determine how packets are to be forwarded.

Figure 4A:
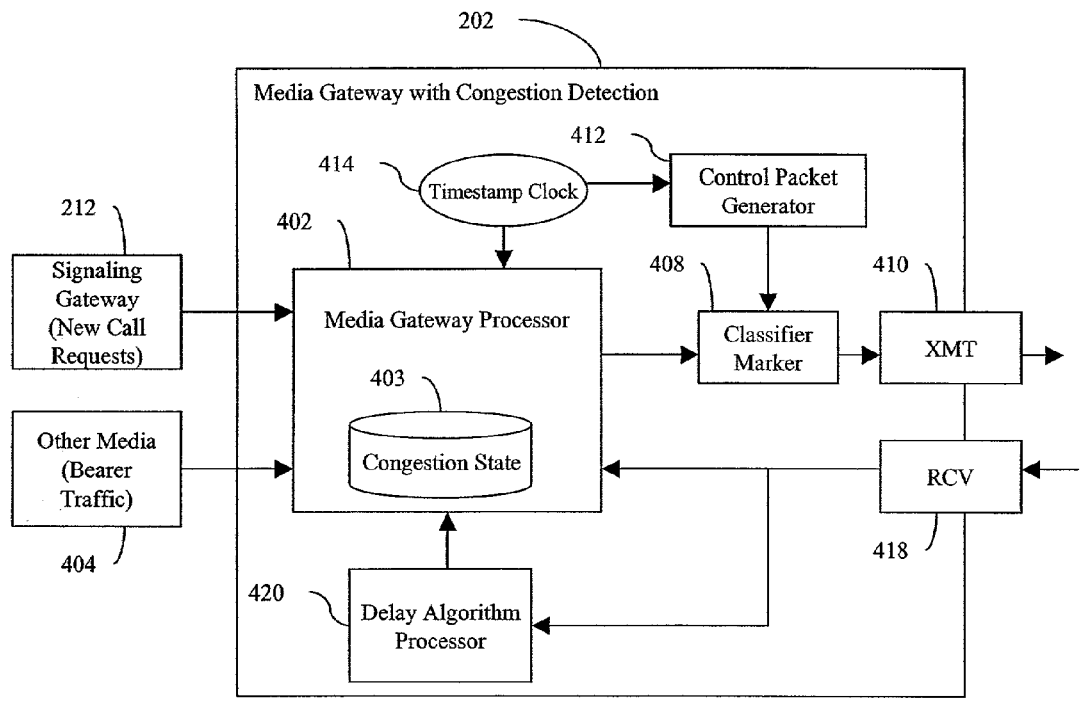
FIG. 4A is a block diagram of a media gateway with congestion detection in an embodiment of the present invention.

FIG. 4 is a block diagram of a media gateway 202 with congestion detection in an embodiment of the present invention. The media gateway 202 includes the functionality of a conventional media gateway, which is implemented by a media gateway processor 402. The media gateway processor 402 receives bearer traffic arriving from PSTN trunks or from other sources such as media gateways in other domains, private branch exchanges, primary rate ISDN trunks, or even individual telephone lines 404. The media gateway processor 402 communicates with the signaling gateway 212 to establish new calls across the IP network (not shown). The media gateway processor 402 also timestamps RTP packets and forwards them into the network. The media gateway processor also includes a congestion state table 403. The table 403 stores the current or recent congestion state of the network. The media gateway processor 402 utilizes this information in performing CAC.

In order to implement congestion detection according to the present invention, the media gateway 402 in an embodiment of the present invention also includes a classifier marker 408, a transmitter (XMT) 410, a control packet generator 412, and a timestamp clock 414. The control packet generator 412 adds a timestamp to packets, using the timestamp clock 414, and forwards the packets into the IP network (no shown). The classifier marker 408 classifies and marks both the control packets and the RTP bearer packets with a DiffServ code point.

The media gateway 202 also includes a receiver (RCV) 418. When the receiver 418 receives packets, it forwards the packets to the media gateway processor 402. The receiver 418 also forwards the packets or the timestamp information contained in the packet headers to the delay algorithm processor 420. The delay algorithm processor 420 utilizes the timestamp information contained in the headers to determine whether to admit or deny new calls and forwards this information to the media gateway processor 402. As is described in greater detail with reference to FIG. 9, if the delay algorithm processor 420 instructs the media gateway processor to deny new calls, the media gateway processor 402 refuses new call requests from the signaling gateway 212. If the decision is to admit new calls the media gateway processor 402 begins admitting new calls until the delay algorithm processor 420 signals that new calls should be denied.

In an embodiment of the present invention, it is necessary for the timestamp clock 414 in each media gateway 202 to be traceable back to the same stratum 1 clock (not shown) because the gateways are switching TDM voice calls, which require highly accurate synchronization. The clock may also be used to measure one-way delay between two gateways. A stratum 1 clock is an extremely accurate timekeeping device, such as an atomic or radio clock. Primary stratum 1-level devices synchronize other lower strata timekeeping devices via a hierarchical subnet, using radio, satellite, and/or modem. In addition, a lower strata timekeeping device may be kept accurate using a network access card, utilizing network time protocol (NTP) or digital time synchronization service (DTSS). NTP is a protocol, which is capable of synchronizing distributed clocks within milliseconds to stratum 1-level devices accessible on the Internet. An embodiment of the present invention may use other stratum 1-level timekeeping devices, such as Loran-C and GPS receivers.

An embodiment of the present invention utilizes one-way delay of packets traversing a network between edge devices to determine network congestion. Delay refers to the time it takes a packet to move from one point on the network to another. Delay causes echo, the reflection of the speaker's voice from the destination telephone equipment back to the source telephone, and talker overlap, when one caller is speaking at the same time as the other caller. Computer networking delay is conventionally categorized as processing delay, queuing delay, transmission delay, and propagation delay. Processing delay, also called accumulation or algorithmic delay, is the amount of time required by the router to process the packet header to determine a route and any other tasks required on each packet, such as error checks, before the packet is directed to an output queue. All packets experience this processing delay, and the processing delay is very similar regardless of packet size.

Queuing delay is the amount of time a packet waits in a queue before arriving at the head of the queue and transmission onto the link begins. Propagation delay is the amount of time required to propagate a bit from one end of a link to the other end of the link. The propagation delay depends on the length of the link and the type of medium, such as twisted pair copper, single mode fiber, microwave radio frequency (RF), etc. Transmission delay refers to the amount of time it takes to transmit all of the bits in a packet from the output queue into the transmission link. A cumulative delay above 150–200 milliseconds (ms) is considered generally unacceptable. For toll-quality phone calls, delay should be less than 100 ms.

Other causes can reduce the quality of VoIP service. For example, jitter can cause the sound of voices participating in a VoIP call to sound unnatural. Jitter is caused by variations in the timing of voice packets. Voice packets are generated by codecs at orderly, periodic time intervals. The number of bytes in a packet and the time interval between packets are determined by the particular codec that is used. Over a converged network, voice packets are interleaved with data packets, causing the normally orderly voice packets to arrive at disorderly intervals, resulting in jitter.

Also, the IP network may drop voice packets due to network congestion. When data packets are dropped, the sending system can simply retransmit the lost packets. Unfortunately, because of the time necessary to retransmit packets, voice packets cannot be retransmitted. Therefore, carriers strive to minimize the number of dropped packets. In Conventional IP phone systems, packet loss in excess of 2.5–5% is unacceptable.

Figure 4B:
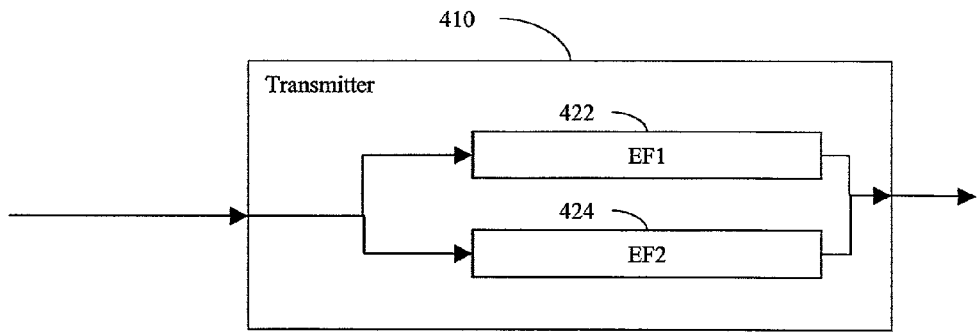
FIG. 4B is a block diagram of the transmitter in the media gateway, illustrating three queues utilized in an embodiment of the present invention.

FIG. 4B is a block diagram of the transmitter 410 of the media gateway 202. In an embodiment of the present invention, the transmitter 410 is capable of utilizing a plurality of queues, which are each assigned a relative priority level. In the embodiment shown, the transmitter 410 includes two queues. The highest priority queue is the EF1 queue 422. In an embodiment of the present invention, the EF1 queue 422 processes and transmits the control packets. The transmitter 410 also includes an EF2 queue 424. The EF2 queue 424 processes RTP bearer packets and has a relative priority lower than that assigned to the EF1 queue 422.

Figure 4C:
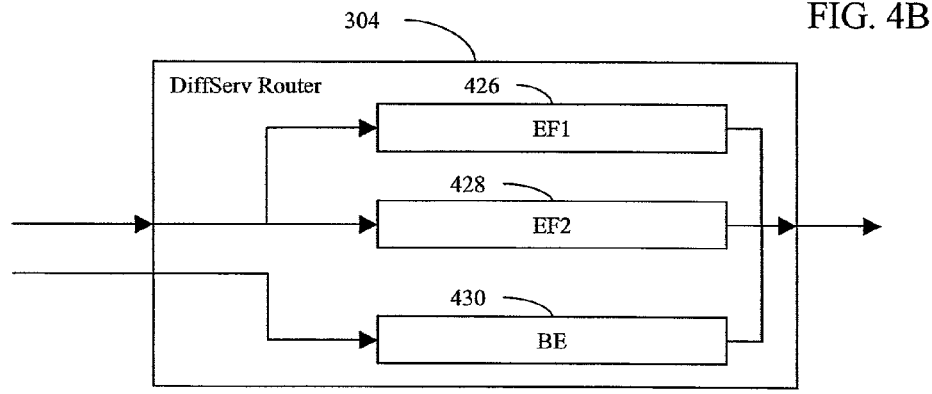
FIG. 4C is a block diagram of a queue within a DiffServ router.

FIG. 4C is a block diagram of the queue within a DiffServ router 304. In addition to the EF1 426 and EF2 428 queues, which process data from the Media Gateway transmitter 410, the DiffServ router 304 also includes a BE (Best Effort) queue 430. Data packets enter the IP network via a separate interface on the DiffServ router 304 and are placed in the BE queue 430. The BE queue 430 has the lowest relative priority of the three queues.

Figure 5:
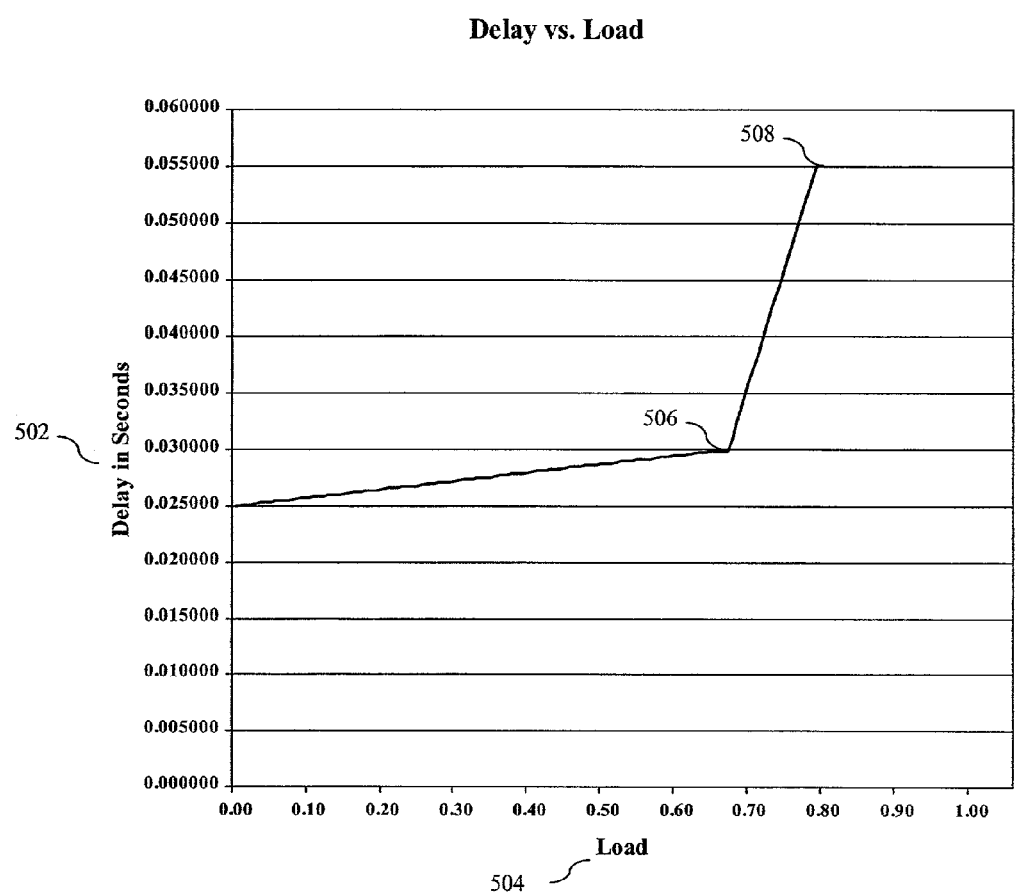
FIG. 5 is a line graph illustrating the relationship between network delay and load in an embodiment of the present invention.

To clearly understand the systems and methods of the present invention, it is necessary to understand the relationship between the load on a network and the delay encountered by packets traversing the network. FIG. 5 is a line graph illustrating the relationship between network delay and network load. In the graph, delay in seconds 502 is plotted versus load 504 as a percentage of capacity of a link between the source and the destination. Delay in a network remains relatively constant over a broad range of load percentage. However, as the network reaches congestion, the delay increases sharply. This is illustrated by the "knee" curve 506. Beyond the point of congestion 506, the delay continues to increase until the network will accept no additional load 508.

Figure 6:
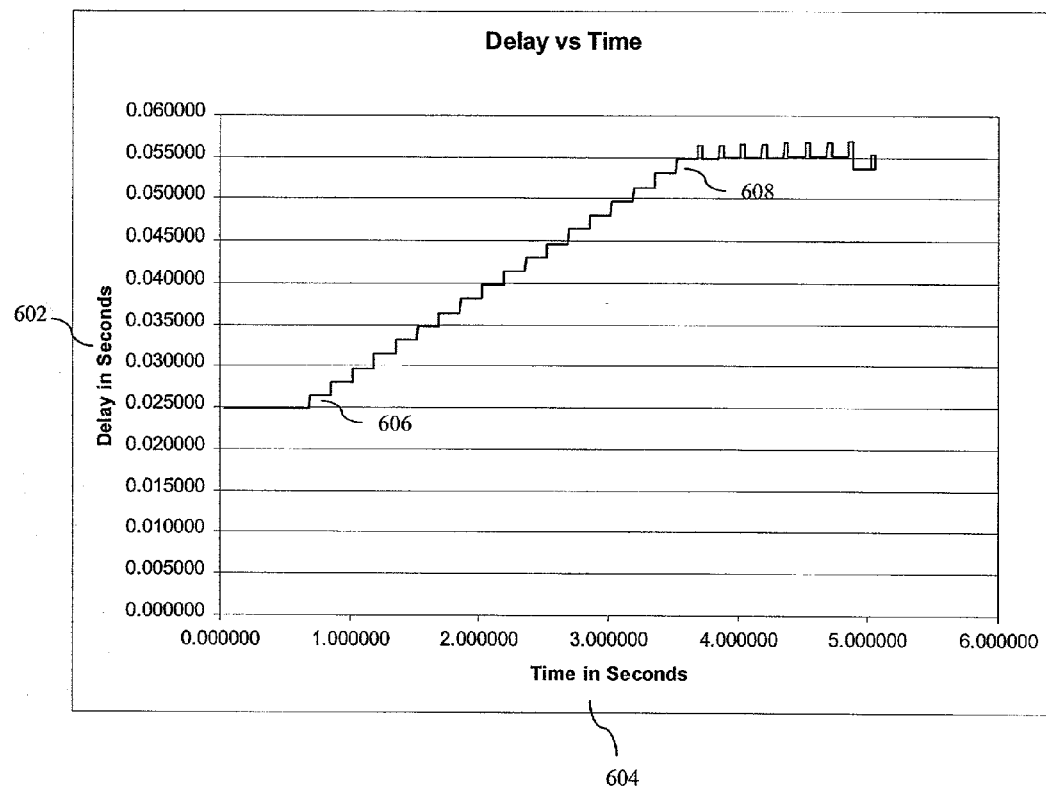
FIG. 6 is a line graph illustrating the relationship between network delay and time in an embodiment of the present invention.

FIG. 6 is a line graph illustrating the relationship between network delay 602 and time 604 in a simplified network. In a simplified network, where there is only one queue, one constant bit rate source, and one destination, the one-way delay across the network remains constant until the capacity of the link between the output queue and the destination is exceeded 606. As soon as the capacity of this link is exceeded the queue begins to increase in length and the delay begins to increase and continues to increase until the queue is full and begins dropping packets 608. Beyond this point 608 the delay oscillates between two fixed points.

The situation becomes progressively more complicated as routers and sources are added to the network and statistical methods and simulations must be used to analyze the situation. However, the basic idea of detecting the knee of the curve illustrated in FIGS. 5 and 6 still applies. In an embodiment of the present invention, when impending congestion is suggested by this increase in delay 506, 606, the media gateway (202) begins refusing calls to prevent further congestion and to allow the congestion to subside before beginning to admit more calls.

As illustrated in FIG. 6, in the simplified model with a single source and destination, and a single router and first-in-first-out (FIFO) output queue, when the link between the output queue and the destination becomes overloaded 606, the queue grows until packets are discarded 608. Up until the link becomes overloaded 606, the queue will remain empty and the delay across the network will be the minimum delay. When we add multiple queues, having various relative levels of priority, to the simplified model the analysis becomes more complex.

If the link is not congested, that is, there is sufficient bandwidth to transfer all of the packets arriving at the router, and if a data packet arrives at the best-effort queue just the instant before the arrival of a control packet into the high-priority DiffServ queue, and there are no bearer packets in the low-priority DiffServ queue, the data packet will begin transmitting. The control packet in the high-priority queue must wait for the data packet in the best-effort queue to finish transmitting before the control packet can be transmitted. Waiting for the data packet causes a slight delay to the control packet so that its one-way delay is slightly longer than the minimum.

By the same reasoning, the bearer packets will experience the same phenomena if a data packet arrives into the best-effort queue just the instant before the arrival of a bearer packet into the low-priority queue, and if there are no control packets in the high-priority queue. This delay is a component of queuing delay. A similar delay occurs when a control packet must wait in the high-priority queue until a bearer packet is transmitted. These types of delays occur even if the link between the router and the destination are not congested and in effect add a noise component or uncertainty to the delay capacity curve shown in FIG. 6. This uncertainty can be analyzed using stochastic methods to determine a threshold that will give a high probability of making the correct choice to either admit or reject new calls.

Figure 7:
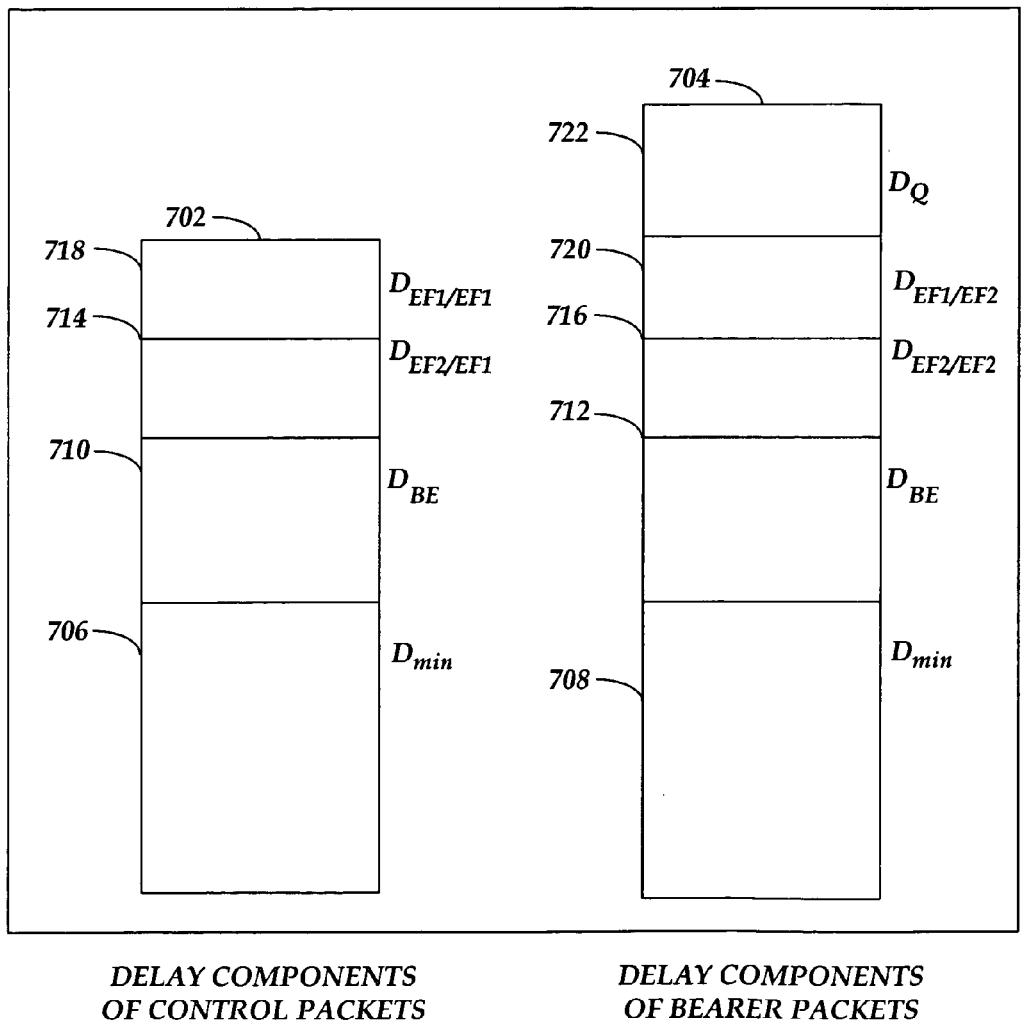
FIG. 7 is a stacked bar graph illustrating the various components of delay for various types of packets in an embodiment of the present invention.

FIG. 7 is a stacked bar graph illustrating the various components of delay for a control packet 702 and a bearer packet 704 in an embodiment of the present invention. The propagation delay, processing delay and transmission delay make up the component $D_{min}$ 706, 708. $D_{min}$ is the minimum delay across the network and is experienced by all control packets and bearer packets.

As illustrated in FIG. 4C, EF1 packets are control packets arriving in the high-priority DiffServ queue (426). EF2 packets are bearer packets arriving in a low-priority DiffServ queue (428). BE packets are data packets arriving in a best-effort queue (430). The queuing delay can be broken into several components. $D_{BE}$ 710, 712 is the delay both EF1 and EF2 packets experience when they have to wait on a BE data packet to transmit and the output link is not congested by too many calls. $D_{EF2/EF1}$ 714 is the delay experienced by an EF1 control packet when an EF2 bearer packet arrives just an instant earlier than the control packet and the control packet must wait for the bearer packet to be transmitted before beginning to transmit. $D_{EF2/EF2}$ 716 is the delay experienced by two or more EF2 packets arriving from different sources into the output queue at the same time. $D_{EF1/EF1}$ 718 is the delay experienced by two or more EF1 packets arriving from different sources into the output queue at the same time. $D_{EF1/EF2}$ 720 is the delay experienced by an EF2 bearer packet when it must wait for an EF1 packet to be transmitted and there is not congestion on the output link.

For purposes of an embodiment of the present invention, the most important component is the $D_Q$ component 722, which is the queuing delay due to there being more calls than can be supported by the output link. This is the component that tells us of the congestion state of the network. In fact the $D_Q$ component 722 remains zero until the capacity of the output link is exceeded by more calls than can be supported in the EF2 bearer queue. The $D_Q$ component 722 has the same characteristic delay capacity curve as that shown in FIG. 6. The other queuing delay components add a noise component or uncertainty to the curve.

As more sources and more routers are added to the network, the queuing delay components due to simultaneous arrivals can be considered random variables, and the probability distribution functions can be approximated as Gaussian due to the Central Limit Theorem. The Central Limit Theorem states that the sum of a large number of independent observations from the same distribution has, under certain general conditions, an approximate normal distribution. A normal or Gaussian distribution is usually represented by a bell-shaped curve symmetrical about the mean.

Based on this analysis, a probability of a correct choice to either admit or deny new calls into the network can be derived. An embodiment of the present invention uses this analysis to implement a mechanism to enable detection of congestion and make decisions as to when to stop admitting new calls and when to begin admitting new calls into the network.

Figure 8:
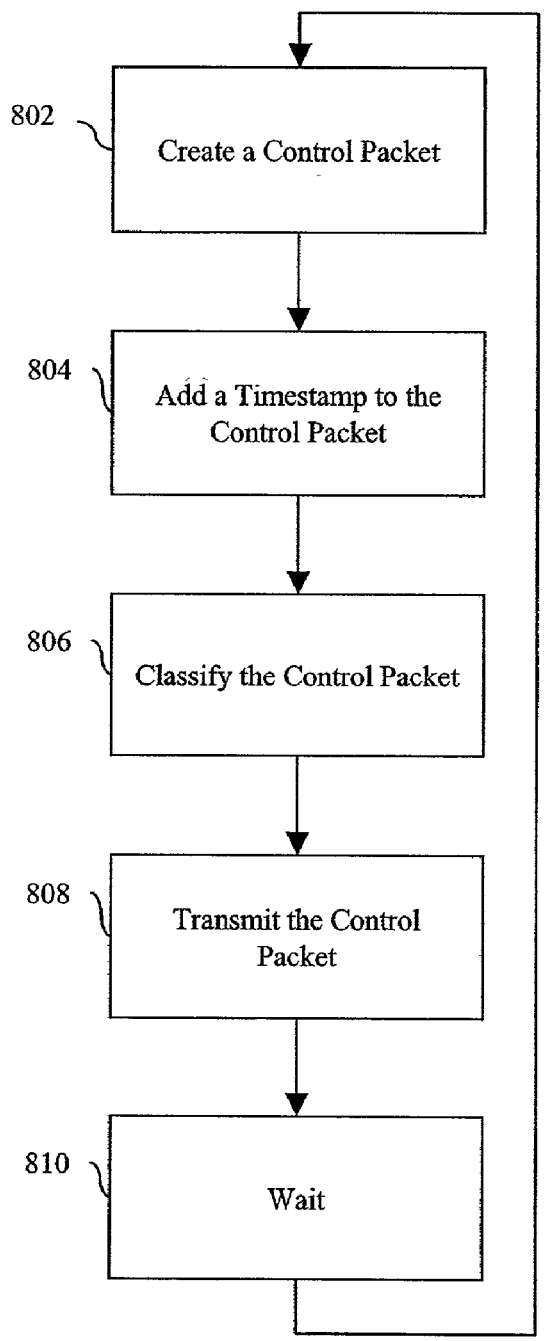
FIG. 8 is a flow chart illustrating the process of creating and transmitting control packets in an embodiment of the present invention.

FIG. 8 is a flow chart illustrating the process a media gateway (202) as illustrated in FIG. 4 implements to create and transmit control packets in an embodiment of the present invention. The control packet generator (412) creates a control packet 802 and timestamps the packet after obtaining the time from timestamp clock (414) 804. The classifier marker 408 then classifies or sets the priority of the control packet 806. The classifier marker (408) uses a DiffServ code point of the highest possible forwarding equivalence class (FEC), EF1 in FIG. 7. The classifier marker (408) marks no other traffic with the EF1 code point so that these control packets experience the minimum delay possible across the network. The transmitter (410) then transmits the control packets across the network to other media gateways (not shown) 808. In order to determine the congestion present in the network, the media gateway (202) creates and transmits control packets periodically. In the process shown in FIG. 8, the media gateway waits some period of time 810 and then repeats steps 802–810.

As with conventional systems, the media gateway (202) also forwards bearer traffic across the network. In an embodiment of the present invention, the media gateway sends the bearer packets with a DS code point with the next to highest possible forwarding class, EF2. The bearer packets, which are RTP packets, also include a source timestamp, and the delay algorithm processor (420) uses the timestamp to measure the one-way delay experienced by the bearer traffic.

Figure 9:
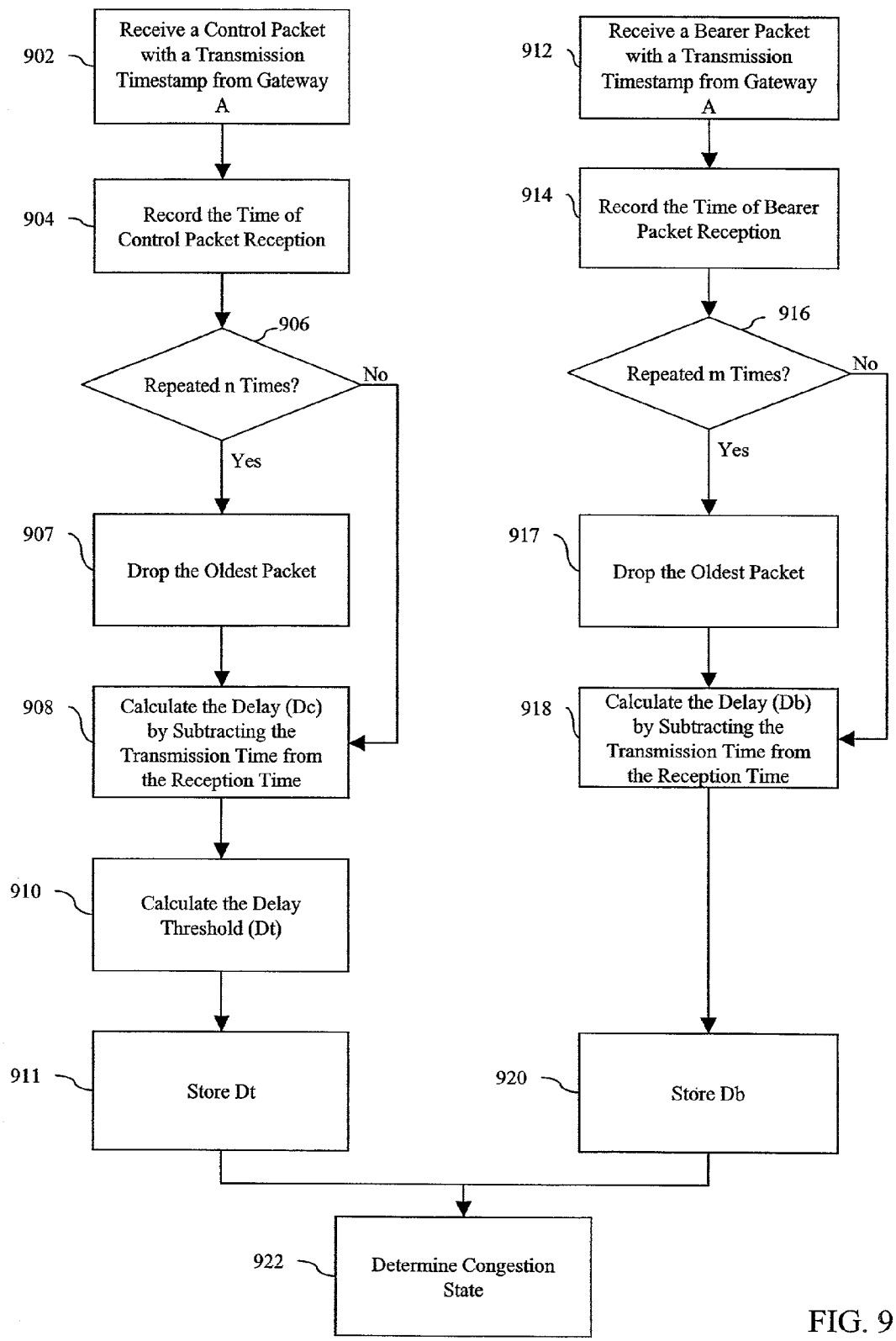
FIG. 9 is a flowchart illustrating the process of performing congestion detection and connection admission control in an embodiment of the present invention.

FIG. 9 is a flowchart illustrating the process of performing congestion detection and connection admission control in an embodiment of the present invention. In an embodiment of the present invention, the media gateway (202) attempts to determine the point at which a communication link becomes congested. By comparing the minimum delay experienced by the control packets in the EF1 queue with the delay experience by the bearer traffic in the EF2 queue, the media gateway (202) detects the point at which the link becomes congested, and the congestion state of the network can be inferred.

As shown in FIG. 8, in one embodiment of the present invention, the source media gateway (202) timestamps the control packets with the current time and transmits the control packets to the destination media gateway (not shown), which records the arrival time. In embodiment of the present invention, the destination media gateway includes the components of the source media gateway (202) as illustrated in FIG. 4, and therefore, all references to both the source and destination media gateway are made with reference to FIG. 4.

As shown in FIG. 9, two sub-processes occur simultaneously and in parallel, the process of calculating the delay threshold Dt based on the control packets, 902–911, and the process of calculating bearer packet delay Db, 912–922. According to the process shown in FIG. 9, the media gateway receiver (418) receives a control packet from a source media gateway (202), gateway A 902. When the media gateway receiver (418) receives a control packet, the media gateway processor (402) utilizes the timestamp clock (414) to record the arrival time of the packet 904. For purposes of the following description, Tcs denotes the timestamp of the control packet at the source media gateway (202). Tcd denotes the arrival time of the control packet at the destination.

The sub-process 902–911 is repeated as the media gateways (202) repeat the process of sending and receiving control packets. If the process has been repeated n times 908, information regarding the oldest packet, the first packet received is dropped 907. The most recent record of Dc is denoted as Dc(0), the next most recent record of Dc as Dc(1) and so on, so that the n control packet delays are given by:

$$Dc=[Dc(0), Dc(1), Dc(2), \ldots Dc(n-1)] \quad \text{[Equation 1]}$$

Using the arrival and departure time of a control packet, the delay algorithm processor (420) can calculate the delay of the control packet, Dc, as follows 906:

$$Dc=Tcd-Tcs \quad \text{[Equation 2]}$$

In an embodiment of the present invention, the delay algorithm processor (420) next determines the threshold delay (Dt) for the link between the two media gateways (202) 910. In one embodiment, the delay algorithm processor (420) determines the delay of the $p_{th}$ percentile of the control delay array, Dc, which is designated Dp. The processor (420) first determines the minimum of the control delay array, Dc, designated Dmin. Dmin represents the minimum delay across the network. Dp is somewhere near the maximum of the delay across the network but not the maximum. The variable, p, is tunable based on the actual network implementation. For example, in one embodiment, p is 95%. The threshold delay, Dt is given by the following formula:

$$Dt = v*(Dp - Dmin) + Dmin \quad \text{[Equation 3]}$$

Where v is a tunable multiplier in the range from one to two ($1 \leq v \leq 2$), and:

$$Dp = p\text{th percentile}(Dc) \quad \text{[Equation 4]}$$

$$Dmin = \min(Dc) \quad \text{[Equation 5]}$$

In another embodiment of the present invention, Dt is determined based on the mean of the control delay array, Dc, which designated as $D_\mu$. The delay threshold is given by the following formula:

$$Dt = u*(D_\mu - Dmin) + Dmin \quad \text{[Equation 6]}$$

Where u is a tunable multiplier in the range from one to four, ($1 \leq u \leq 4$). Dmin is determined as described above. The value of Dt is stored in the congestion state table (403) 911.

RTP bearer packets are processed in a similar manner. However, bearer packets are transmitted at a lower priority relative to the control packets. The source media gateway (202) timestamps bearer packets with the current time and transmits the packets to the destination. The destination media gateway (202) receives the bearer packet once it has traversed the IP network 912. The destination gateway (202) records the arrival time to calculate delay 914.

As with Dc, an embodiment of the present invention maintains the last m records of Db 916, 917, which are given by:

$$Db = [Db(0), Db(1), Db(2), \ldots Db(m-1)] \quad \text{[Equation 7]}$$

The number of elements in Db, which is given by m, is tunable but would normally be in the range of one to five ($1 \leq m \leq 5$).

The destination gateway (202) calculates delay by subtracting the source timestamp from the arrival time 918. Tbs denotes the timestamp of the bearer packet at the source; Tbd denotes the arrival time of the bearer packet at the destination. Therefore, the delay of the RTP bearer packet, Db is calculated as follows:

$$Db = Tbd - Tbs \quad \text{[Equation 8]}$$

The source and destination clocks need not be absolutely synchronized to determine delay, i.e., at any instant in time, the clocks do not have to read the same. However, they must maintain relative synchronization over time, i.e., their clocks must maintain the same relative distance over time. To state this mathematically, If $Ts(t_0)$ is the time on the source at time instant zero and $Td(t_0)$ is the time on the destination at time instant zero, then it is not necessary for $Ts(t_0) = Td(t_0)$. However if $Ts(t_1)$ is the time on the source at some time instant one, and $Td(t_1)$ is the time on the destination at time instant one, then the following must be true for all $t_n$:

$$Ts(t_1) - Ts(t_0) = Td(t_1) - Td(t_0) \quad \text{[Equation 9]}$$

Thus the values of Dc and Db can actually be negative. This is not a problem since we are only interested in the relative delay difference between Dc and Db, and any offset in their clocks is subtracted out.

In one embodiment of the present invention, once the destination gateway has calculated Db, the value is stored in the congestion state table (403) 920 for later use. The congestion state is then determined 922. In another embodiment, the values of Dt and Db are first compared, and a flag is stored in the table (403) denoting whether or not to accept call requests for a destination.

Figure 10:
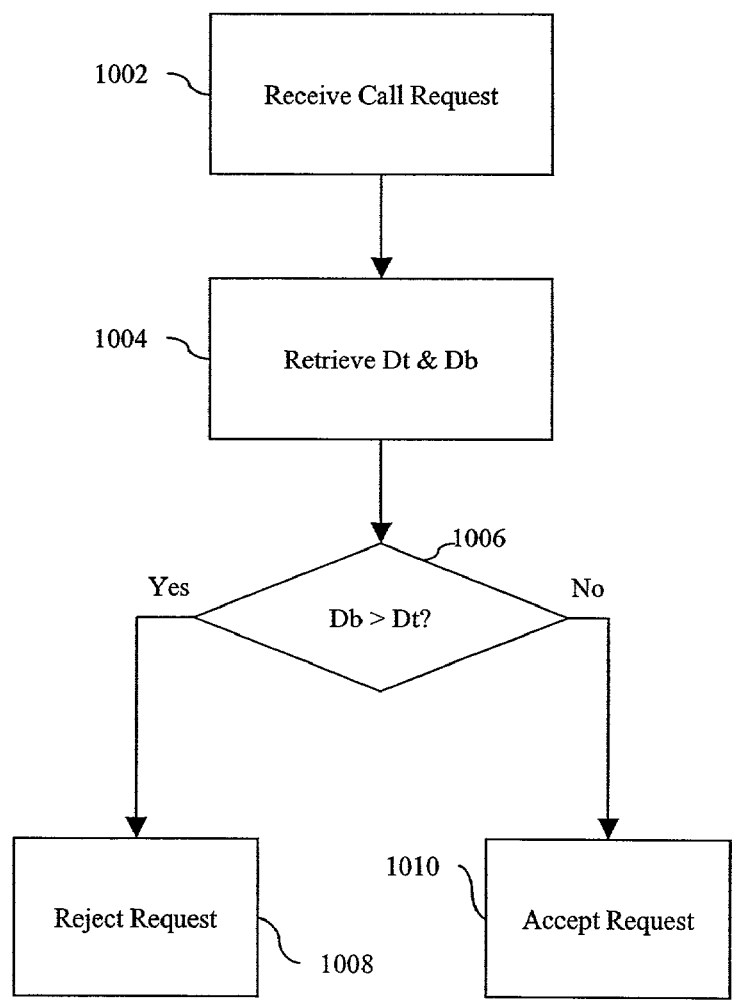
FIG. 10 is a flow chart illustrating the handling of a communications request in an embodiment of the present invention.

FIG. 10 is a flowchart illustrating the handling of a communications request in an embodiment of the present invention. The media gateway receives a request to create a call to a specific destination 1002. The source media gateway (202) retrieves Db and Dt from the congestion state table 403. If all of the elements of Db exceed Dt then congestion is implied and the media gateways (202) at both ends of a communication should stop admitting new calls until none of the elements of Db exceed Dt. If Db>Dt, the source gateway (202) rejects the request 1008. If Dt≦Db, the request is accepted 1010. In another embodiment, the congestion state table (403) includes a flag for each destination gateway (202) on the network, denoting whether or not connection requests to the destination should be accepted. This flag is updated periodically.

An embodiment of the present invention includes a computer-readable medium, having computer-readable instructions for performing congestion detection. The computer-readable medium may also include program code for performing connection admission control. A computer-readable medium includes an electronic, optical, magnetic, or other storage or transmission device capable of providing a processor, such as the processor in a web server, with computer-readable instructions. Examples of such media include, but are not limited to, a floppy disk, CD-ROM, magnetic disk, memory chip, or any other medium from which a computer processor can read. Also, various other forms of computer-readable media may transmit or carry instructions to a computer, including a router, private or public network, or other transmission device or channel.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

What is claimed is:

1. A method for detecting congestion in a communications network comprising:
    (a) determining a control packet transmission duration for a control packet, said control packet having a control packet transmission priority;
    (b) determining a bearer packet transmission duration for a bearer packet, said bearer packet having a bearer packet transmission priority, wherein said bearer packet transmission priority is lower than said control packet transmission priority;
    (c) calculating a delay in a transmission of said bearer packet; and
    (d) comparing said delay to a threshold delay.

2. The method of claim 1, further comprising:
    (e) rejecting a communication request when said delay exceeds said threshold delay.

3. The method of claim 1, further comprising:
    (e) redirecting a communication request when said delay exceeds said threshold delay.

4. The method of claim 1, further comprising calculating said threshold delay.

5. The method of claim 1, wherein said calculating of said threshold delay comprises:
    determining a mean control packet delay;
    multiplying said mean control packet delay by a multiplier;
    determining a minimum control packet delay; and
    adding the result of said multiplying to said minimum control packet delay.

6. The method of claim 1, wherein said calculating comprises:
- determining a control packet delay for a specified percentile of all bearer packets;
- multiplying said control packet delay by a multiplier;
- determining a minimum control packet delay; and
- adding the result of said multiplying to said minimum control packet delay.

7. The method of claim 1, further comprising transmitting said control packet.

8. The method of claim 1, further comprising creating said control packet.

9. The method of claim 1, further comprising setting said control packet transmission priority.

10. The method of claim 1, further comprising transmitting said bearer packet.

11. The method of claim 1, further comprising setting said bearer packet transmission priority.

12. The method of claim 1, further comprising repeating steps a–c.

13. The method of claim 1, further comprising:
- (i) rejecting a communication request when said queuing delay exceeds said threshold delay.

14. The method of claim 1, further comprising:
- (i) redirecting a communication request when said queuing delay exceeds said threshold delay.

15. A method for detecting congestion in a communications network comprising:
- (a) receiving a control packet, having a control packet transmission priority and a control packet source timestamp;
- (b) recording a control packet time received;
- (c) determining a control packet transmission duration by subtracting said control packet source timestamp from said control packet time received;
- (d) receiving a bearer packet, having a bearer packet transmission priority and a bearer packet source timestamp, wherein said bearer packet transmission priority is lower than said control packet transmission priority;
- (e) recording a bearer packet time received;
- (f) determining a bearer packet transmission duration by subtracting said bearer packet source timestamp from said bearer packet time received;
- (g) calculating a queuing delay encountered by said bearer packet by subtracting said control packet transmission duration from said bearer packet transmission duration; and
- (h) comparing said queuing delay to a threshold delay.

16. The method of claim 15, further comprising calculating said threshold delay.

17. A computer-readable medium on which is encoded computer program code for detecting congestion in a communications network comprising:
- (a) computer program code for determining a control packet transmission duration for a control packet, said control packet having a control packet transmission priority;
- (b) computer program code for determining a bearer packet transmission duration for a bearer packet, said bearer packet having a bearer packet transmission priority, wherein said bearer packet transmission priority is lower than said control packet transmission priority;
- (c) computer program code for calculating a delay in a transmission of said bearer packet; and
- (d) computer program code for comparing said delay to a threshold delay.

18. The computer-readable medium of claim 17, further comprising:
- (e) computer program code for rejecting a communication request when said delay exceeds said threshold delay.

19. The computer-readable medium of claim 17, further comprising:
- (e) computer program code for redirecting a communication request when said delay exceeds said threshold delay.

20. The computer-readable medium of claim 17, further comprising program code for calculating said threshold delay.

21. The computer-readable medium of claim 20, wherein said program code for calculating said threshold delay comprises:
- program code for determining a mean control packet delay;
- program code for multiplying said mean control packet delay by a multiplier;
- program code for determining a minimum control packet delay; and
- program code for adding the result of said multiplying to said minimum control packet delay.

22. The computer-readable medium of claim 20, wherein said program code for calculating said threshold delay comprises:
- program code for determining a control packet delay for a specified percentile of all bearer packets;
- program code for multiplying said control packet delay by a multiplier;
- program code for determining a minimum control packet delay; and
- program code for adding the result of said multiplying to said minimum control packet delay.

23. The system of claim 22, wherein said first media gateway comprises an IP voice tandem.

24. The system of claim 22, wherein said second media gateway comprises an IP voice tandem.

25. The computer-readable medium of claim 17, further comprising program code for transmitting said control packet.

26. The computer-readable medium of claim 17, further comprising program code for creating said control packet.

27. The computer-readable medium of claim 17, further comprising program code for setting said control packet transmission priority.

28. The computer-readable medium of claim 17, further comprising program code for transmitting said bearer packet.

29. The computer-readable medium of claim 17, further comprising program code for setting said bearer packet transmission priority.

30. The computer-readable medium of claim 17, further comprising program code for repeating steps a–c.

31. A computer-readable medium on which is encoded computer program code for detecting congestion in a communications network comprising:
- (a) program code for receiving a control packet, having a control packet transmission priority and a control packet source timestamp;
- (b) program code for recording a control packet time received;
- (c) program code for determining a control packet transmission duration by subtracting said control packet source timestamp from said control packet time received;

(d) program code for receiving a bearer packet, having a bearer packet transmission priority and a bearer packet source timestamp, wherein said bearer packet transmission priority is lower than said control packet transmission priority;

(e) program code for recording a bearer packet time received;

(f) program code for determining a bearer packet transmission duration by subtracting said bearer packet source timestamp from said bearer packet time received;

(g) program code for calculating a queuing delay encountered by said bearer packet by subtracting said control packet transmission duration from said bearer packet transmission duration; and (h) program code for comparing said queuing delay to a threshold delay.

32. The computer-readable medium of claim 31, further comprising program code for:

(i) rejecting a communication request when said queuing delay exceeds said threshold delay.

33. The computer-readable medium of claim 31, further comprising program code for:

(i) redirecting a communication request when said queuing delay exceeds said threshold delay.

34. The computer-readable medium of claim 31, further comprising program code for calculating said threshold delay.

35. A system for detecting congestion in a communications network comprising:

a first media gateway in communication with said communications network, wherein said first media gateway comprises:

a timestamp clock, a control packet generator in communication with said timestamp clock, and a classifier marker in communication with said control packet generator;

a second media gateway in communication with said communications network, wherein said second media gateway comprises:

a system clock, and a delay calculator in communication with said system clock.

36. The system of claim 35, wherein said timestamp clock comprises a first stratum-1-classified signal receiver time.

37. The system of claim 35, wherein said system clock comprises a second stratum-1-classified signal receiver time.

38. The system of claim 35, wherein said communications network comprises an Internet protocol (IP) network.

39. The system of claim 35, wherein said first stratum-1-classified signal receiver time comprises a network access card.

40. The system of claim 35, wherein said first stratum-1-classified signal receiver time comprises a global positioning system receiver.

41. The system of claim 35, wherein said second stratum-1-classified signal receiver time comprises a network access card.

42. The system of claim 35, wherein said second stratum-1-classified signal receiver time comprises a global positioning system receiver.

43. The system of claim 35, wherein said classifier marker comprises a differentiated services (DiffServ) classifier marker.

44. The system of claim 35, wherein said classifier marker comprises:

a control packet queue; having a first transmission priority; and a bearer packet queue, having a second transmission priority, wherein said first transmission priority is higher than said second transmission priority.

45. The system of claim 35, further comprising a connection admission controller in communication with said delay calculator.

* * * * *